3,755,532
METHOD OF MAKING NaF OR NaF/AlF$_3$ INVOLVING THE REACTION OF SODIUM SULFATE WITH FLUOSILICIC ACID
Maurice Clark Harrison and Donald Otis Vancil, Longview, Wash., assignors to Reynolds Metals Company, Richmond, Va.
No Drawing. Original application Aug. 7, 1970, Ser. No. 62,129. Divided and this application June 7, 1972, Ser. No. 260,588
Int. Cl. C01f 7/54, 7/50; C01d 3/02
U.S. Cl. 423—116          1 Claim

ABSTRACT OF THE DISCLOSURE

A sodium fluoride-aluminum fluoride double salt, such as chiolite, of high purity and virtually free from CaO and P$_2$O$_5$ contamination, is prepared from impure fluosilicic acid containing these impurities, such as the by-product from the manufacture of phosphates from phosphate rock, by treating a portion of the fluosilicic acid with a reactive aluminous material to convert it completely to AlF$_3$, and separating the precipitated CaO, P$_2$O$_5$, and silica, reacting a second portion of the fluosilicic acid with sodium sulfate to form sodium fluosilicate substantially free of CaO and P$_2$O$_5$ decomposing the fluosilicate to sodium fluoride; admixing aqueous solutions of the AlF$_3$ and NaF at about 140° F.–190° F. while maintaining the pH between about 3.0 and 6.8 to keep SiO$_2$ in solution, and recovering the precipitated double salt.

---

This application is a division of prior copending application S.N. 62,129, filed Aug. 7, 1970, now U.S. 3,704,092, issued Nov. 28, 1972.

BACKGROUND OF THE INVENTION

This invention relates to a novel process for the production of a sodium fluoride-aluminum fluoride double salt or mixture, having a weight ratio of NaF to AlF$_3$ which is less than 1.5, such as, for example, a low NaF/AlF$_3$ ratio chiolite or cryolite, and which is virtually free from CaO and P$_2$O$_5$ contamination, from fluosilicic acid which is characterized by a substantial content of these impurities. A typical source of such impure fluosilicic acid is the process of acidification of phosphate rock to produce superphosphate and other phosphate fertilizers and other phosphate salts, wherein the fluosilicic acid is a by-product. The waste fluosilicic acid has for many years constituted a major waste disposal and pollution control problem to the phosphate industry, inasmuch as its low purity has been an impediment to the development of suitable markets.

It has been suggested in the prior art to utilize fluosilicic acid for the production of synthetic cryolite which could then be employed in the manufacture of aluminum by electrolytic reduction. However, in cell operation, it is necessary that the presence of calcium and phosphorus be kept below very low tolerances, since these substances adversely affect cell operation, and for other reasons which are well known in the art. The known processes for the utilization of fluosilicic acid for the manufacture of cryolite, although they have managed to eliminate most of the silica present, have not successfully removed the CaO and P$_2$O$_5$ impurities.

Thus, it has been proposed to react fluosilicic acid with alumina to produce aluminum fluoride solution and separately to react fluosilicic acid with sodium carbonate to form sodium fluoride solution, which is then acidified with a mineral acid such as sulfuric acid to bring it to a pH value of about 3.5, the two solutions being thereafter mixed to precipitate cryolite and retain the silica present in solution. This has two drawbacks, however. One of these is that part of the sodium carbonate is consumed in neutralizing the sulfuric acid added to lower the pH, incidentially creating a purity problem attributable to the sodium sulfate thus formed. The other, and more important disadvantage is that the cryolite product remains contaminated by the CaO and P$_2$O$_5$, since these impurities will not have been effectively removed from the system prior to the formation of the cryolite.

Thus, the problem of utilizing impure fluosilicic acid, such as phosphate by-product fluosilicic acid contaminated with CaO and P$_2$O$_5$, for the successful production of a high purity sodium fluoride and aluminum fluoride double salt or mixture having a weight ratio of NaF to AlF$_3$ less than 1.5, remained unsolved until the present invention.

GENERAL DESCRIPTION OF THE INVENTION

In accordance with the present invention, there is provided a novel process for the production of a sodium fluoride-aluminum fluoride double salt or mixture having a weight ratio of NaF to AlF$_3$ less than 1.5 from an impure fluosilicic acid, such as that derived as a by-product of phosphate rock treatment.

The product of the process of the invention may embrace a range of materials comprising double salts or mixtures of NaF and AlF$_3$ having a weight ratio of NaF to AlF$_3$ less than 1.5, which double salts or mixtures may also contain uncombined AlF$_3$. Thus, the terms double salt or mixture as employed herein include products characterized by the ratio of the total weight of NaF contained in a given quantity to the total weight of AlF$_3$ present, without regard to the presence or absence of chemical bonding between the NaF and the AlF$_3$. In the case of naturally occuring cryolite the value of this weight ratio is about 1.5, which corresponds to the double salt 3NaF.AlF$_3$. For the double salt chiolite, the NaF/AlF$_3$ weight ratio is 0.833, which corresponds to the formula 5NaF.3AlF$_3$. The process of the present invention is especially concerned with the preparation of a product which comprises principally chiolite, from waste or by-product fluosilicic acid, and this aspect will serve to illustrate the principles and practice of the invention. It should be understood, however, that these principles apply to the preparation of any desired range of NaF-AlF$_3$ double salts or mixtures having a weight ratio to NaF to AlF$_3$ less than 1.5, and that the description with regard to chiolite is for purposes of exemplification and illustration only, and is not to be regarded as limiting the invention.

In accordance with the invention, a sodium fluoride-aluminum fluoride double salt or mixture having a weight ratio of NaF to AlF$_3$ less than 1.5 which is virtually free from CaO and P$_2$O$_5$ contamination is produced from a fluosilicic acid which is characterized by a substantial content of these impurities, by a process which comprises (a) reacting a first portion of the fluosilicic acid with an amount of a reactive aluminous material sufficient to form AlF$_3$ and to assure complete conversion of the fluosilicic acid to AlF$_3$, thereby allowing separation of the CaO and P$_2$O$_5$ and SiO$_2$ as an insoluble precipitate; (b)

promptly separating the insoluble precipitate from the $AlF_3$ solution; (c) reacting a second portion of the fluosilicic acid with a sufficient amount of sodium hydroxide or sodium carbonate to form NaF and to assure complete conversion of the fluosilicic acid, thereby allowing separation of the CaO and $P_2O_5$ and $SiO_2$ as an insoluble precipitate; (d) separating the insoluble precipitate from the NaF solution; (e) adding the NaF solution to the $AlF_3$ solution at a temperature between about 140° F. and about 190° F. in a proportion such as to achieve a terminal pH in the admixed solution between about 3.0 and about 6.8, thereby allowing precipitation of the desired sodium fluoride-aluminum fluoride double salt or mixture having a weight ratio of NaF to $AlF_3$ less than 1.5; and (f) recovering said sodium fluoride-aluminum fluoride double salt or mixture.

By careful control of reaction conditions throughout the foregoing sequence of steps, there can be produced, for example, a double salt or mixture which is predominantly (95% or more) chiolite. Moreover, the process can be controlled so that substantially all of the $P_2O_5$ and CaO present are eliminated as insoluble precipitates, presumably of calcium phosphate, and do not appear in the final product. At the same time, there takes place a parallel elimination of undesired silica impurities.

The performance of the conversion of impure fluosilicic acid to aluminum fluoride is based upon the principle that while both the CaO and the $P_2O_5$ are soluble in fluosilicic acid, they are insoluble in $AlF_3$ solution. Accordingly, it is necessary to assure that a sufficient amount of a suitable aluminous material which is reactive with the fluosilicic acid is employed so that conversion to $AlF_3$ is complete.

Suitably reactive aluminous materials include those which are in a form which is readily attacked by the fluosilicic acid. Examples include Bayer process alumina hydrate, aluminum hydroxide from other sources, low-iron content bauxite, and good grades of kaolin and clay. Advantageously an amount of aluminous material is used which furnishes a quantity of alumina slightly in excess of the amount needed to react stoichiometrically with the fluosilicic acid, for example, a 5% excess.

The fluosilicic acid, as mentioned previously, may be a waste of by-product material from phosphate rock acidification, and will typically analyze between about 15% and 20% $H_2SiF_6$, preferably above 16%, and have a pH less than about 1.0.

As the fluosilicic acid reacts with the soluble alumina at a temperature between about 140° F. and about 190° F., preferably 145° F.–185° F., the pH rises. When the pH reaches about 2.7, the conversion to $AlF_3$ is practically complete. Alternatively, the fluosilicic acid can be first brought to the desired temperature and then added to the alumina.

This reaction is rapid and takes generally up to 15–30 minutes, which is usually sufficient to allow the $P_2O_5$, the CaO, and the silica, to separate as an insoluble precipitate. During this reaction and precipitation period, the pH of the mixture may rise to about 3.0. The precipitated impurities or gangue are promptly separated by filtration, generally for a period not exceeding about 5 to 10 minutes, and the clarified $AlF_3$ solution is then ready for subsequent use in NaF/$AlF_3$ double salt or mixture formation. The pH of the clarified solution is thus on the acid side.

In the steps of producing NaF solution from impure fluosilicic acid and sodium carbonate or hydroxide, control of temperature and pH is also of importance, in order to insure substantially complete precipitation of the CaO and $P_2O_5$ impurities, as well as a high proportion of the silica present. Here the fluosilicic acid is reacted with a sufficient amount of the sodium compound to form NaF and to effect complete conversion of the fluosilicic acid, which point is evidenced by attaining a pH between about 7.0 and about 7.5, preferably about 7.2–7.3, and thus is on the alkaline side. The reaction temperature here is between about 175° F. and about 205° F., and preferably above 200° F. The time of reaction and digestion to permit separation of the insoluble $SiO_2$ precipitate, which also contains the $P_2O_5$ and CaO impurities, is set at a minimum of about 1 hour, and this period of time also facilitates filtration of the insolubles. The clarified NaF solution is then ready for the NaF/$AlF_3$ double salt or mixture formation step.

In accordance with the invention, the clarified NaF solution is then added to the clarified $AlF_3$ solution in a proportion such as to achieve a terminal pH in the admixed solution between about 3.0 and about 6.8, i.e. so that there is an excess of $AlF_3$ over the NaF present. At first a pH value of about 3.0, which is that of the $AlF_3$, is obtained on admixing the solutions. This pH remains stable while the reaction proceeds until it suddenly begins to rise, indicating completion of the reaction. The product obtained depends upon the terminal pH, which may be any desired value, and which allows precipitation of the desired sodium fluoride-aluminum fluoride double salt or mixture having a weight ratio of NaF to $AlF_3$ less than 1.5. Control of the terminal pH of the mixture with precautions being taken to assure that it does not rise beyond 6.8, keeps the mixture always on the acid side, and determines the specific NaF/$AlF_3$ ratio product which is produced.

The formation of the NaF/$AlF_3$ double salt or mixture having a weight ratio of NaF to $AlF_3$ less than 1.5 takes place within a temperature range of about 140° F. to about 190° F., preferably between about 145° F. and about 185° F.

Typically, where the product is to be a double salt corresponding in composition to chiolite $Na_5Al_3F_{14}$, the concentration of the NaF solution will be the order of 42 grams per liter, while that of the $AlF_3$ solution will be about 220 grams per liter. The respective pH values will be about 7.2 or 7.3, and 2.7. A reaction time of between about 30 and 60 minutes will result in a low NaF/$AlF_3$ ratio chiolite concentration of about 75 grams per liter, and a pH depending upon the relative proportions of the NaF and $AlF_3$ reactants. In general, because of the relatively low concentration of NaF (42 g.p.l.) due to its lower solubility, and the higher solubility of $AlF_3$, which is 4 to 5 times more soluble, it is desirable to make a product that utilizes as much $AlF_3$ and as little NaF as possible, i.e. with a low ratio of NaF/$AlF_3$. For chiolite, this ratio is about 0.83.

The divergence in pH values for the NaF (high pH) and $AlF_3$ (low pH) solutions, respectively, prior to their admixture to form the double salt, provides a margin of higher pH values, whereby it is possible by the process of the present invention to eliminate the addition of a mineral acid to adjust acidity, which is characteristic of prior art processes for removing silica. Such mineral acid, e.g. sulfuric acid, simply introduces a further contaminant and a concomitant problem of its neutralization and/or removal. This is entirely avoided by the present process.

In accordance with another aspect of the invention, the impure fluosilicic acid can first be converted to a comparatively pure sodium fluosilicate by reacting it with sodium sulfate. This results in important economies in transportation costs. The sulfuric acid thus recovered can be concentrated and returned to the phosphate rock treatment plant. This also results in virtually complete removal of the CaO and $P_2O_5$ present. The sodium fluosilicate produced in this manner can be collected with a recovery of 95% or higher, and contains only about 0.002% $P_2O_5$. By calcination of the sodium fluosilicate at about 800° C., it decomposes to form high purity NaF powder, which can be dissolved in water to form a reactant solution for the production of a NaF-$AlF_3$ double salt. The $SiF_4$ thus liberated may be collected by dissolving it in water to form fluosilicic acid of high purity.

DESCRIPTION OF THE PREFERRED EMBODIMENTS

The following examples serve to illustrate the practice of the invention, but are not to be regarded as limiting:

EXAMPLE 1

1000 ml. of a fluosilicic acid solution having a concentration of 16.4% $H_2SiF_6$, and containing .060% by weight of CaO and .068% by weight of $P_2O_5$, was reacted with a bauxite analyzing 45% $Al_2O_3$ until the pH of the acid rose to 2.7, and then a small additional amount of bauxite was added, with stirring to assure complete reaction of the acid. The reaction mixture was digested at 165° F. for 40 minutes, at the end of which time the pH had risen to 3.0. The mixture was filtered and the $AlF_3$ solution, which contained 200 g.p.l. $AlF_3$ was set aside. Another 1000 ml. of the fluosilicic acid solution was reacted with sodium carbonate until the pH was 7.3, while heating at 160° F. for 30 minutes. The resulting solution was filtered, and the NaF solution thus obtained contained 42 d.p.l. NaF.

As calculated for chiolite, 1000 ml. of the filtered NaF solution were added to 250 ml. of the $AlF_3$ solution to attain a pH of about 3.0, and a precipitate was obtained and filtered which showed a weight of 85 grams, and analyzed 57.2% fluorine, representing a fluorine recovery of better than 90%. The content of the filtrate was 1.40 g.p.l. F, and the filtrate was recycled for ultimate recovery of this amount. The silica content of the product was 0.11%, Ca less than 0.001%, and $P_2O_5$ less than 0.001%. The analysis of the dried product showed it to have a composition corresponding to chiolite.

EXAMPLE 2

The procedure described in Example 1 was followed, but the aluminous material used to react with the fluosilicic acid was a Bayer process alumina hydrate, $Al(OH)_3$, taken into solution with NaOH and precipitated with $CO_2$. The resulting chiolite product had a fluorine content of 57.4%, $SiO_2$ 0.13%, $Fe_2O_3$ 0.03%, and Ca and $P_2O_5$ each less than 0.001%.

EXAMPLE 3

Following the general procedure described in Example 1, there was employed for the preparation of the NaF solution, 100 ml. of a solution of 16.4% fluosilicic acid. This was reacted with 17.75 gms. $Na_2SO_4$ for 15 minutes at 160° F. to produce 23.5 gms. $Na_2SiF_6$ and $H_2SO_4$ aqueous solution having a concentration of 10.9% $H_2SO_4$. The $Na_2SiF_6$ thus produced was calcined at 800° C. to produce pure NaF. The $Na_2SiF_6$ had analyzed Ca 0.002% and $P_2O_5$ less than 0.002%. The NaF was dissolved in water to a concentration of 42 g.p.l.

EXAMPLE 4

205.5 ml. of 188 g.p.l. $H_2SiF_6$ were reacted with 46.1 grams $Al(OH)_3$ and the reaction mixture was filtered 114 ml. of 188 g.p.l. $H_2SiF_6$ were reacted with 47.35 grams of $Na_2CO_3$ and the reaction mixture was filtered. The NaF solution was then added to the $AlF_3$ solution slowly at about 160° F. until the pH rose from 3.0 to about 3.6. The precipitated solids were filtered and dried at 250° C.

| | | |
|---|---|---|
| F | | 55.80 |
| $SiO_2$ | percent | 0.09 |
| $Fe_2O_3$ | do | 0.03 |
| $P_2O_5$ | do | <0.001 |
| Ca | do | <0.001 |
| Ratio $NaF/AlF_3$ | | .94 |

EXAMPLE 5

205.5 ml. of 188 g.p.l. $H_2SiF_6$ were reacted with 46.1 grams of $Al(OH)_3$ and the reaction mixture was filtered. 114 ml. of 188 g.p.l. $H_2SiF_6$ were reacted with 47.35 grams of $Na_2CO_3$ and the reaction mixture was filtered. The NaF solution was added to the $AlF_3$ solution slowly at about 160° F. until the pH rose from 3.0 to 5.4. The precipitated solids were filtered and dried at 250° C.

| | | |
|---|---|---|
| F | | 54.60 |
| $SiO_2$ | percent | 0.12 |
| $Fe_2O_3$ | do | 0.03 |
| $P_2O_5$ | do | <0.001 |
| Ca | do | <0.001 |
| Ratio $NaF/AlF_3$ | | 1.20 |

EXAMPLE 6

Solutions were made up exactly as in Examples 4 and 5, but the NaF solution was added slowly to the $AlF_3$ solution until the pH rose to 6.6. The precipitated solids were filtered and dried at 250° C.

| | | |
|---|---|---|
| F | | 53.50 |
| $SiO_2$ | percent | 0.18 |
| $Fe_2O_3$ | do | 0.03 |
| $P_2O_5$ | do | <0.001 |
| Ca | do | <0.001 |
| Ratio $NaF/AlF_3$ | | 1.42 |

What is claimed is:

1. Method for the production of a sodium fluoride-aluminum fluoride double salt or mixture having a weight ratio of NaF to $AlF_3$ less than 1.5, and substantially free from CaO and $P_2O_5$, from fluosilicic acid characterized by a substantial content of CaO and $P_2O_5$ impurities, comprising the steps of:

(a) reacting a first portion of the fluosilicic acid with an amount of a reactive aluminous material sufficient to form $AlF_3$ and to assure complete conversion of the fluosilicic acid to $AlF_3$, thereby allowing separation of the CaO and $P_2O_5$ and $SiO_2$ as an insoluble precipitate;

(b) promptly separating the insoluble precipitate from the $AlF_3$ solution;

(c) reacting a second portion of the fluosilicic acid with a sufficient amount of sodium sulfate to convert the fluosilicic acid to sodium fluosilicate substantially free from CaO and $P_2O_5$, and sulfuric acid, recovering and heating the sodium fluosilicate at a temperature sufficient to decompose it to form NaF;

(d) dissolving the NaF in water to form NaF solution;

(e) adding the NaF solution to the $AlF_3$ solution at a temperature between about 140° F. and about 190° F. in a proportion such as to achieve a terminal pH in the admixed solution between about 3.0 and about 6.8, thereby allowing precipitation of the desired sodium fluoride-aluminum fluoride double salt or mixture having a weight ratio of NaF to $AlF_3$ less than 1.5; and (f) recovering said sodium fluoride-aluminum fluoride double salt or mixture.

References Cited

UNITED STATES PATENTS

| | | | |
|---|---|---|---|
| 1,247,165 | 11/1917 | Stahl | 423—341 X |
| 2,994,582 | 8/1961 | Byrns | 423—465 |
| 3,049,405 | 8/1962 | Trupiano et al. | 423—465 |
| 3,175,882 | 3/1965 | Derr | 423—116 |
| 3,493,331 | 2/1970 | Vancil et al. | 423—116 |
| 3,551,098 | 12/1970 | Flemmert | 423—499 X |
| 3,567,370 | 3/1971 | Clifford | 423—465 |

FOREIGN PATENTS

| | | | |
|---|---|---|---|
| 505,661 | 9/1954 | Canada | 423—465 |
| 546,971 | 10/1957 | Canada | 423—465 |
| 643,510 | 9/1950 | Great Britain | 423—465 |
| 951,787 | 3/1964 | Great Britain | 423—490 |

EDWARD STERN, Primary Examiner

U.S. Cl. X.R.

423—341, 465, 489, 490